United States Patent
Lutz et al.

(10) Patent No.: US 9,751,060 B2
(45) Date of Patent: Sep. 5, 2017

(54) METHOD AND DEVICE FOR MIXING AT LEAST TWO LIQUID COMPONENTS

(71) Applicant: J. Wagner AG, Altstätten (CH)

(72) Inventors: Gilbert Lutz, Kriessern (CH); Josef Manser, Appenzell (CH)

(73) Assignee: J. WAGNER AG, Altstätten (CH)

( * ) Notice: Subject to any disclaimer, the term of this patent is extended or adjusted under 35 U.S.C. 154(b) by 457 days.

(21) Appl. No.: 14/404,346

(22) PCT Filed: Mar. 20, 2013

(86) PCT No.: PCT/EP2013/000848
§ 371 (c)(1),
(2) Date: Nov. 26, 2014

(87) PCT Pub. No.: WO2013/178306
PCT Pub. Date: Dec. 5, 2013

(65) Prior Publication Data
US 2015/0165403 A1 Jun. 18, 2015

(30) Foreign Application Priority Data
May 29, 2012 (DE) .......................... 10 2012 010 544

(51) Int. Cl.
*B01F 15/00* (2006.01)
*B01F 15/02* (2006.01)
(Continued)

(52) U.S. Cl.
CPC ........ *B01F 15/00415* (2013.01); *B01F 3/088* (2013.01); *B01F 3/0861* (2013.01);
(Continued)

(58) Field of Classification Search
CPC ................................................ B01F 15/00415
(Continued)

(56) References Cited

U.S. PATENT DOCUMENTS 3,869,067 A    3/1975   Ashmead et al.
4,427,298 A *   1/1984   Fahy .................. B01F 15/0429
                                                          137/624.18
(Continued)

FOREIGN PATENT DOCUMENTS

| CH | 39910 | 6/1963 |
|----|-------|--------|
| CN | 1864840 A | 11/2006 |

(Continued)

OTHER PUBLICATIONS

International Search Report and Written Opinion of the International Searching Authority issued in PCT application No. PCT/EP2013/000848; mailed Jun. 18, 2013, 11 pages.

*Primary Examiner* — David Sorkin
(74) *Attorney, Agent, or Firm* — Brinks Gilson & Lione

(57) ABSTRACT

A method for mixing at least two liquid components of a two- or multi-component wet coating system, wherein a feed component under a first hydraulic pressure set at constant is fed discontinuously through a variable passage cross-section to a parent component under a second hydraulic pressure set at constant. An actual feed quantity of the feed component is detected and the feed quantity of the feed component is regulated with respect to a target feed quantity for the feed component in such a way that a timing cycle of the discontinuous feed and the passage cross-section for the feed component are influenced.

13 Claims, 6 Drawing Sheets

(51) Int. Cl.
  *B01F 15/04*   (2006.01)
  *B01F 3/08*    (2006.01)
  *G05D 11/13*   (2006.01)
  *B01F 5/06*    (2006.01)

(52) U.S. Cl.
  CPC ........ *B01F 15/024* (2013.01); *B01F 15/0429* (2013.01); *B01F 15/0479* (2013.01); *G05D 11/133* (2013.01); *B01F 5/0602* (2013.01)

(58) Field of Classification Search
  USPC ......... 366/152.1, 152.2, 160.1–160.5, 179.1, 366/182.4
  See application file for complete search history.

(56) References Cited

U.S. PATENT DOCUMENTS

| | | | |
|---|---|---|---|
| 2002/0048213 A1* | 4/2002 | Wilmer | B01F 5/0451 366/136 |
| 2004/0141409 A1* | 7/2004 | Breithaupt | B01F 3/08 366/152.2 |
| 2006/0035381 A1 | 2/2006 | Bary | |

FOREIGN PATENT DOCUMENTS

| | | |
|---|---|---|
| CN | 101043935 A | 9/2007 |
| DE | 33 05 890 A1 | 8/1984 |
| DE | 43 32 125 A1 | 3/1995 |
| DE | 101 21 950 A1 | 11/2002 |
| EP | 0 420 146 | 3/1991 |
| ES | 259266 | 1/1961 |
| JP | H11-007324 A | 1/2011 |

\* cited by examiner

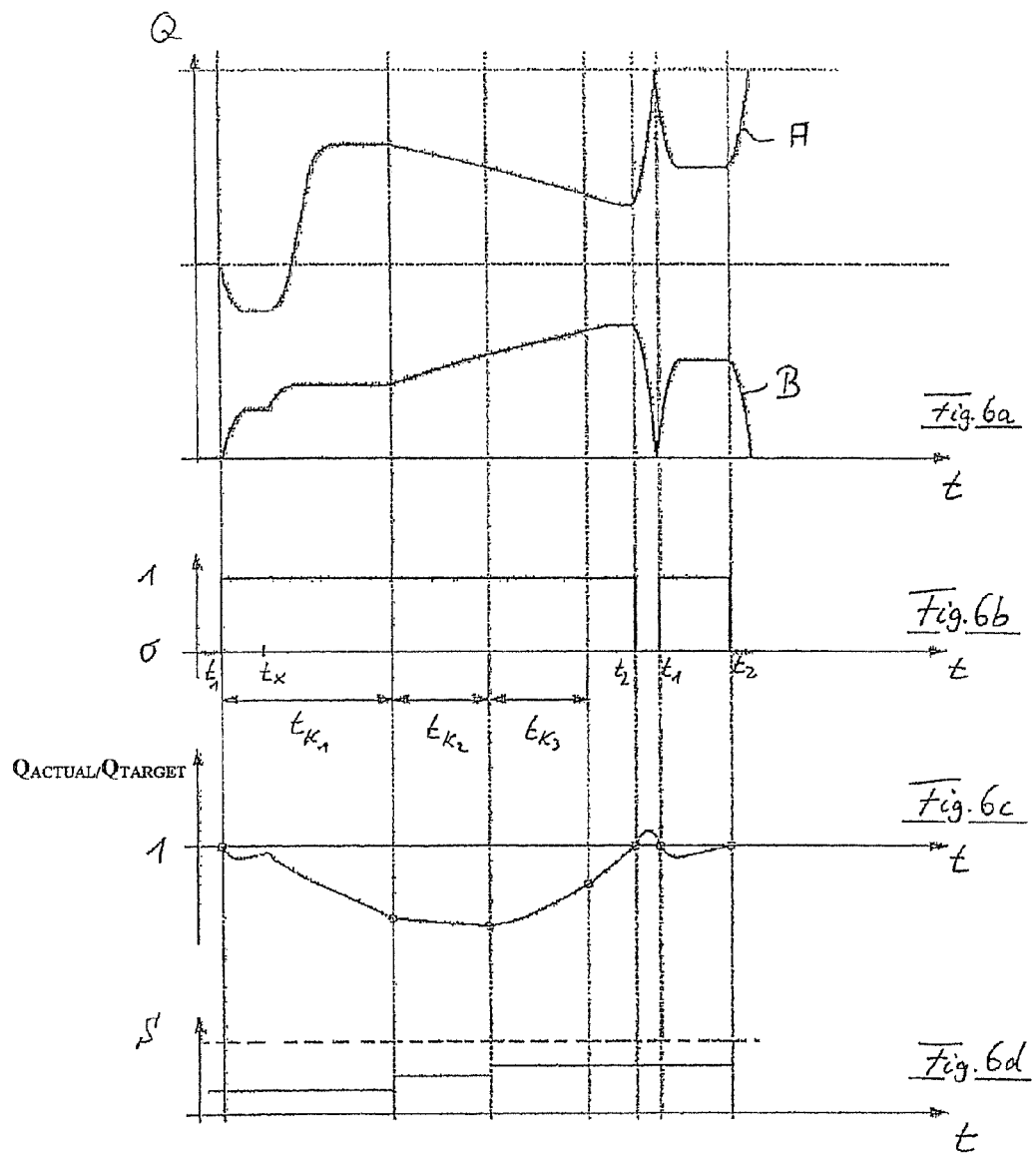

METHOD AND DEVICE FOR MIXING AT LEAST TWO LIQUID COMPONENTS

CROSS REFERENCE TO RELATED APPLICATION

This application represents the National Stage entry of PCT International Application No. PCT/EP2013/000848 filed on Mar. 20, 2013, which claims the benefit of German Patent Application No. 10 2012 010 544.4 filed on May 29, 2012, both of which are fully incorporated herein by reference.

BACKGROUND

The subject matter disclosed herein relates to a method and a device for mixing at least two liquid components. In particular, the subject matter disclosed herein relates to a method and a device for mixing at least two liquid components of a two- or multi-component wet coating system and a two- or multi-component mixer of a two- or multi-component wet coating system. Such a method is used for example in a two-component lacquering system in the wet area, wherein hydraulic conditions with a delivery pressure of the liquid components of, for example, 50 bar to 530 bar, and, in one embodiment, 160 bar to 180 bar, are built up. At least two liquid components are brought together in a common flow and then mixed in a mixing block, in order that the component mixture can then be atomized at a nozzle, for example, of a spray gun. Such a system is used to coat large-area components, such as steel girders, or small-area components, such as plastic components, for example, in automotive engineering. In one embodiment, the coating is formed by a mixture of the components which is as homogeneous as possible.

In the area of the wet lacquering technique, two liquid components separated from one another are united at a feed point, whereby a feed component, such as a hardener, a thinner or a colorant, is added to a parent component, such as a lacquer component A. The two components are conveyed, for example, with a piston pump. For a discontinuous feed of the feed component, an inlet valve is disposed in the conveying line thereof for opening and closing the feed line. Such a mixing device is known from German Patent Reference No. DE 33 05 890 A1, wherein the parent component is also fed discontinuously to the feed point for the formation of the main flow of the mixture, which is then passed on to the mixing block. After the discontinuous component feeds have been brought together, the main flow of the mixture represents an alternating sequence of component packets of high, if not pure, concentration. The mixing block and the mixing line to the delivery nozzle serve to mix the packet sequence and to distribute the component concentration of the main flow as uniformly as possible. A control system monitors the discontinuous conveying of the individual components and sets or resets the inlet valves accordingly. Different mixture metering ratios can be set with the known device. A flow quantity meter is provided in each case for the components for the purpose of monitoring. With the known mixing device, however, a problem arose in that, even with very efficient mixing blocks and mixing tubes, a sufficiently homogeneous mixing concentration can not be achieved or can only be achieved with a very high outlay on a suitable control and design. To this extent, the known mixing device is used only where the concentration ratio is permitted in a relatively high tolerance range, in particular, in the case of large-area coatings. The known mixing device is, however, less suitable for metering rapidly reacting components with a high required metering accuracy because sufficiently homogeneous mixing cannot be achieved.

In order to achieve a higher metering accuracy, it is conceivable to consider a continuous feed of the feed component, i.e., without a preliminary packet formation in the main flow. It has been possible to create a continuous delivery by means of control-based adjustable pressure controllers and control technology. Such a continuous, electronically controlled pressure control is known from German Patent Reference No. DE 43 32 125 A1. According to the known mixing method, electronically actuated pressure controllers are used both for the parent component and for the feed component. It has emerged that such continuous feeding methods are not suitable in the case of frequently fluctuating hydraulic conditions of the system. Particularly in the area of the wet coating method with delivery pressures between 50 bar and 530 bar, a non-linear hose expansion always has to be taken into account. When use is made of piston pumps, the unavoidable reversal point leads to a non-constant delivery quantity and delivery pressure. A constant consumption quantity is also prevented by frequent activation and deactivation of spray guns. As a result of the hydraulic conditions of high pressure and the unavoidable inertia of mechanical and pneumatic components of the control circuit, a mixing method according to German Patent Reference No. DE 43 32 125 A1 is used only in the case of sustained continuous component flows. On account of very high feed pressures for the components, a stable, non-oscillatory control with short response times can in particular scarcely be achieved when disturbance variables, such as the constant switching-on and switching-off of the spray guns, use of further spray guns and the change in the pump direction of piston pumps, frequently occur. A change in the mixing concentration, such as a readjustment due, for example, to changes in the temperature and the viscosity of the feed component, can be achieved in the case of the known method only by means of correspondingly expensive preliminary adjustments.

It is one object of the disclosed embodiments to overcome the drawbacks of the prior art, in order to make available a method and a device for mixing at least two liquid components in an economically favorable manner, wherein a feed component is fed discontinuously to a parent component to achieve a more homogeneous metering concentration and/or to enable a higher variability in the adjustment of the mixing ratio without high design and ergonomic outlay.

SUMMARY

In certain embodiments, a method and a device are provided for mixing and/or metering at least two liquid components, for example, a two- or multi-component coating system, according to a predetermined mixing ratio. The at least two components can include a parent component, such as a parent lacquer, or a parent component mixture, and a feed or metering component, such as a hardener, a thinner or a colorant, as well as additional components. In one embodiment, the parent component includes the hardener and the feed component includes the parent lacquer. The components are stored in separate reservoirs and are put under a hydraulic pressure by separate pressure generators, such as piston pumps, diaphragm pumps or pressure tanks, in order to bring the components together at a feed point, such as a unifying line switch point. The pressure generators can generate a pressure of over 1 bar (pressure tank) or also over 100 bar (piston pump). In one embodiment, the parent component is subjected to a lower pressure than the feed component. In certain embodiments, the pressure difference between the hydraulic pressures of the liquid components is at least above 0.1 or above 5 bar, or, more specifically, between 10 and 30 bar, or, even more specifically, 20 bar. In one embodiment, the parent component is available without interruption at the feed point, i.e., the feed of the parent component is continuous, as long as a delivery nozzle, such as a spray gun, is actuated. The feed of the parent component is made available by a constant or fixed set, in a particular embodiment unregulated hydraulic pressure. In one embodiment, the feed component under a constant or fixed set, in one embodiment unregulated hydraulic pressure, is not fed continuously to the feed point, but is added discontinuously thereby forming doses of the parent component by means of an on/off timing valve at least at the start of the mixing method. A constant setting of the hydraulic pressure means that the hydraulic pressure itself does not represent a control variable for the mixing method according to the disclosed embodiments. The hydraulic pressure is set externally, for example, by means of a manually actuated pneumatic pressure controller in one embodiment, with the adjustment value (air pressure) fixedly set in advance for the mixing method. The effective dynamic actual hydraulic pressure can vary during the mixing process on account of many operation-related distinctive features, for example, when the piston pump building up the hydraulic pressure reaches a reversal point. In addition, different hydraulic pressures are generated during the downward and upward motion of the piston pump. Control-based influencing of the hydraulic pressure is not required in at least some embodiments of the mixing method disclosed herein. However, it is conceivable for the hydraulic pressure of the parent component and/or the hydraulic pressure of the feed component to be adopted as an additional control variable in order to optimize the mixing process. The metered, discontinuous feed of the feed component is achieved as a result of the higher hydraulic pressure of the feed component, so that the feed component is injected into the unmetered or untimed (continuously provided) parent component in one embodiment. It has been shown that the injection of the feed component achieves a first mixing effect at the feed point because part of the feed component displaces and even "overtakes" parts of the parent component on account of the higher hydraulic pressure. A main mixing flow is achieved by the injected feed of the feed component into a continuous parent component flow, as a result of which a packet solution with a high component concentration is avoided at least during the feed of the feed component. The main mixing flow is formed by a flow segment of high parent component concentration only when the feed of the feed component is absent during a feed pause of the discontinuous feed.

In order to monitor the desired quantity ratio between the parent component and the feed component and, in certain embodiments, further components, at least one actual feed quantity of the feed component is detected, for example, by means of a flow quantity sensor. It should be clear that a corresponding sensor can also be provided for the measurement of the flow quantity of the parent component and/or the additional components. In one embodiment, the flow quantity sensor is, for example, a toothed wheel measuring cell, a spindle flow measuring cell, a Coriolis mass flow meter, or a measuring device which functions by means of indirect measurement, for example, with stroke sensors of piston pumps. The actual feed quantity of the respective component is sent to a control with control electronics. In certain embodiments, the feed quantity of the feed component is regulated with respect to a target feed quantity for the feed component, in such a way that a timing cycle of the discontinuous feed and a passage cross-section for the feed component are influenced. In this way, it is possible to improve the degree of mixing of the main mixing flow without influencing the hydraulic pressure states of the components. In the disclosed embodiments, it is possible to shorten considerably the feed pauses of the discontinuous feed by reducing the passage cross-section for the feed component. In this way, the flow sections with pure parent component concentration become much smaller, as a result of which a more homogeneous mixing ratio is achieved with the delivery of the main mixing flow. By exclusively influencing only the timing cycle and the passage cross-section for the feed component, operational states are achieved in which an interruption of the feed of the feed component is scarcely still necessary, so that no flow sections are formed in the main mixing flow that are constituted solely by the parent component. With the measure of exclusively influencing the timing cycle of the discontinuous feed and the passage cross-section for the feed component, it is possible to use discontinuous mixing concepts with the advantages of ready availability, simple design outlay, as well as easy maintenance and durability, and to profit from mixing conditions which correspond to a continuous mixing concept.

In one embodiment, control for the feed of the feed component is a quantity ratio control, wherein both the actual flow quantity of the parent component and that of the feed component are detected and put into proportion with one another. The amount for the mixing ratio target value can be stored in advance by an operative, for example, in the control electronics. The target feed quantity of the feed component results from the measurement of the actual feed quantity of the parent component and from the mixing ratio target values. Whereas the mixing ratio target value remains constant during the control process having previously been set, the target value for the feed quantity for the feed component can vary, and more precisely as a function of the detected actual flow quantity value of the parent component. The simple basic structure of the discontinuous mixing concept makes it possible for the mixing ratio to be set individually without intervening in the design of the structure of the device. It should be clear that the mixing ratio target value can be not only a single value, but also a target value range defined around a single value, for example ±1%.

In one embodiment, the timing cycle of the discontinuous feed of the feed component includes a temporal sequence of a feed interval, during which the feed component is fed to the parent component and, in a particular embodiment, the variable passage cross-section remains unchanged, and a feed pause following the feed interval, during which feed pause the addition of the feed component is interrupted and the passage cross-section to be changed in a control-based manner is set for a following timing cycle. In this embodiment, it is not necessary to change the passage cross-section during the feed interval. This can simply be carried out when the timing valve is closed, which enables a precise adjustment. It is however quite conceivable that, in the case of higher-grade throttle valves, for example, with an electronic control instead of a pneumatic control, a change in the passage cross-section during the feed interval may be advantageous, especially when a sustained feed interval due to constant mixing conditions is achieved by means of the control according to certain embodiments. A change in the passage cross-section can be carried out during the feed pause and/or during the feed interval.

The temporal sequence of the timing cycle is influenced in a control-based manner in such a way that, in order to optimize the discontinuous feed, in particular in a time-proportional manner, the duration of the feed interval is increased at the expense of a time-proportional reduction, in particular, in the feed pause, if during the monitoring of the actual feed quantity it is ascertained that the actual feed quantity has exceeded the target feed quantity. In order to compensate for the time-proportional increase in the duration of the feed interval, in particular, the variable passage cross-section is reduced as a specific function of the mixing device. With the reduction in the passage cross-section, wherein the setting of the hydraulic pressure for the feed component advantageously remains unchanged, a smaller quantity of the feed component is made available in the following timing cycle, as a result of which the feed quantity control establishes that the target feed quantity value is not reached until later, which leads to the desired extension of the feed interval. Once the target feed quantity for the feed component (after the extended feed interval) is reached again, the feed of the feed component is interrupted and the feed pause begins. The length of the feed pause is not only shorter in percentage terms than the extended feed interval, but on the contrary, on account of the reduced feed quantity for the feed component, an overshoot of the target feed quantity is markedly lessened, as a result of which the feed pause is also shortened in absolute terms. As a result, an extended feed interval and a shortened feed pause is made available not only in a time-proportional manner but also in absolute terms, as a result of which the flow section of pure parent component concentration becomes smaller.

If a mixing operation is carried out in which any disruption variables, such as the change in flow direction of the piston pump, switching on and switching off of spray guns, adding of spray guns, are largely excluded, it is possible after, in a particular embodiment, repeated adjustments of the passage cross-section to find an injection quantity flow for the feed components that is optimum for a desired quantity ratio between the parent component and the feed component. In this embodiment, it may be that a continuous, uncycled feed of the feed component becomes established. Subsequent process continuations can be carried out in this operational state. According to a first alternative embodiment, it is possible after a control time, which for example is fixed in advance in the control electronics and can be, for example, 1.5 seconds, for the passage cross-section to be increased or reduced in size during the continuous feed in a fixed adjustment amplitude range around the set passage cross-section in order to optimize the quantity mixing ratio still further, as a result of which, in particular, the mixing process takes place more or less stationary, without a timing cycle of the feed of the feed component. It is also possible to increase the size of the passage cross-section to such an extent that the target feed quantity value, in particular the target feed quantity value tolerance range, is left so that the feed of the feed component is again interrupted and therefore the discontinuous timed feed of the feed component can begin afresh on the basis of the control.

In one embodiment, the passage cross-section is increased in size if it is ascertained that there is an actual feed quantity that is smaller than the target feed quantity and falling in the course of time, in order to initiate once again the process of the discontinuous feed of the feed component. In one embodiment, the feed component control can be extended in such a way that an optimum feed interval/feed pause ratio is established by the fact that, if for example the percentage share of the feed interval is greater than a predetermined value, such as 50%, 60% or 70%, a further change in the passage cross-section does not take place, in order that the duration of the feed interval and the feed pause are kept constant. This may be advantageous particularly when a sufficiently homogeneous mixing result is obtained with the set feed interval/feed pause ratio.

In one embodiment, a timing cycle begins with the triggering of the feed interval which ends with the triggering of the feed pause when the actual feed quantity reaches or exceeds the target feed quantity. It should be clear that, in order to implement the feed component control according to this embodiment, it is not a matter of determining the temporal duration of the feed interval and/or the feed pause, but rather involves influencing the timing cycle and therefore an extension of the feed interval (a shortening of the feed pause) solely on the basis of the control-based monitoring of the feed quantity of the feed component. In one embodiment, the method advantageously includes determining the time-related start and end points of the feed interval and of the feed pause and to incorporate the latter into the feed component control. This can be achieved, for example, by the fact that a further control-based change in the passage cross-section is prevented with a specific time ratio between the feed interval and the feed pause.

In one embodiment, an oversize for the passage cross-section is set at the start of the method, in particular for the initiation of the feed component control. It should be clear that the oversize can have already been set at the end of the preceding mixing process. It is to be expected with the oversize that the feed pause is already initiated after a short feed interval and a marked overshoot of the target feed quantity. In the course of time, therefore, a sharply increasing ratio of the actual feed quantity to the target feed quantity is reached. In one embodiment, actual feed quantity reaches the preset target feed quantity in less than five seconds.

In one embodiment, an actual/target feed quantity ratio is monitored. In the case of an actual feed quantity less than the target feed quantity and/or a reduction of the actual/target feed quantity ratio, in a particular embodiment the passage cross-section is increased in size in such a way that the actual/target feed quantity ratio increases during the following feed interval.

In one embodiment, the passage cross-section is changed in steps during the feed pause. The passage cross-section is then changed during the feed pause. Alternatively, the change in the passage cross-section can also be carried out during the feed interval. In a particular embodiment, this change is then carried out in steps after further control times, when a balanced actual/target feed quantity ratio is ascertained, in particular during an essentially disruption-free process operation.

In one embodiment, the control-based influencing of the passage cross-section and of the timing cycle is carried out only when a time-related proportion of the feed interval lies at less than 100% in a timing cycle. In this embodiment, the control-based influencing is no longer carried out when the time-related proportion of the feed interval exceeds a predetermined value, such as 50%, 60%, 80% or 90%.

Furthermore, this disclosure relates to a device for metering and/or mixing at least two liquid components, such as a two- or multi-component mixer of a two- or multi-component wet coating system, in a predetermined mixing ratio.

The device according to certain embodiments includes a line system for the separate feeding of at least two components under, in particular, constant or fixedly set hydraulic pressure, wherein the line system includes a parent line and a parent component or a parent component mixture and a feed line emerging into the parent line for a feed component. The line system can include hoses, tubes and functional blocks. The feed point at which the feed line emerges into the parent line can also be referred to as a line junction. Whereas the parent component can pass the feed point unhindered, the feed of the feed component is timed. For this purpose, the device according to certain embodiments includes an on/off timing valve for closing or opening the feed line and therefore for the discontinuous feed of the feed component. In one embodiment, the timing valve is suitable only for closing or opening a flow passage in the feed line. In a particular embodiment, the flow passage cross-section of the timing valve is also adjustable. A non-return valve can be provided in each case upstream of the feed point both in the feed line and also in the parent line in order to prevent an inflow of the component mixture into the respective line which carries a pure component.

The timing valve can be set by means of a pneumatic actuator, which can be connected to control electronics for controlling the feed component quantity of the device.

Furthermore, the device according to certain embodiments includes a throttle device for changing the passage cross-section of the feed line. The throttle device is suitable for changing the passage cross-section in steps and/or continuously in the course of the feed line.

Furthermore, the device according to certain embodiments includes a flow quantity meter for detecting an actual flow quantity of the feed component. Other flow quantity meters for the parent component or other components can also be provided. The flow quantity meter is connected to a control of the flow quantity of the feed component. In particular embodiments, the control includes control electronics, in which the control routine can be stored and the value for the target feed quantity is calculated from the measured actual flow quantity of the parent component with the set mixing target value ratio.

According to certain embodiments, the device includes an actuator which actuates the throttle device. The control in a particular embodiment controls only the actuator and the on/off timing valve in such a way that the passage cross-section is influenced for the control-based change of the flow quantity in its temporal course, as a result of which the timing cycle of the timing valve is simultaneously influenced for the purpose of compensation. This is achieved by the fact that, although a reduced volume flow or mass flow of the feed component is obtained at the feed point, for example, due to the reduction in the size of the passage cross-section, the open phase of the timing valve is extended in order to achieve the mixing ratio or the overshooting thereof. The timing cycle is thus influenced, i.e., the feed interval is extended.

In one embodiment, the throttle device is disposed, in the feed direction, upstream or downstream of the on/off timing valve. Alternatively, the throttle device and the on/off timing valve can be combined in a common component.

In one embodiment, the on/off timing valve is controlled pneumatically. Although greater inertia in the control of the mixing ratio is to be expected with a pneumatic control, the method as disclosed herein is optimally designed to compensate for this inertia.

It should be clear that embodiments of the device can be designed according to the mode of functioning and the process sequence of the method. The same also applies to the method, which can proceed according to the mode of functioning of the device.

BRIEF DESCRIPTION OF THE DRAWINGS

The embodiments disclosed herein are not intended to limit or define the full capabilities of the device or methods. It is assumed that the drawings and depictions constitute exemplary embodiments of the many embodiments of the device and methods.

FIG. 6a shows a flow quantity/time diagram in a particular operational state of the example mixing device;

FIG. 6b shows a time/timing cycle diagram in the initial operational state in a particular operational state of the example mixing device;

FIG. 6c shows a diagram relating to the time-related course of the ratio of the actual feed quantity to the target feed quantity in the initial operational state in a particular operational state of the example mixing device; and FIG. 6d shows a diagram of the time-related course of the passage cross-section at the throttle device of the example mixing device in a particular operational state of the example mixing device.

DETAILED DESCRIPTION

Figure 1:
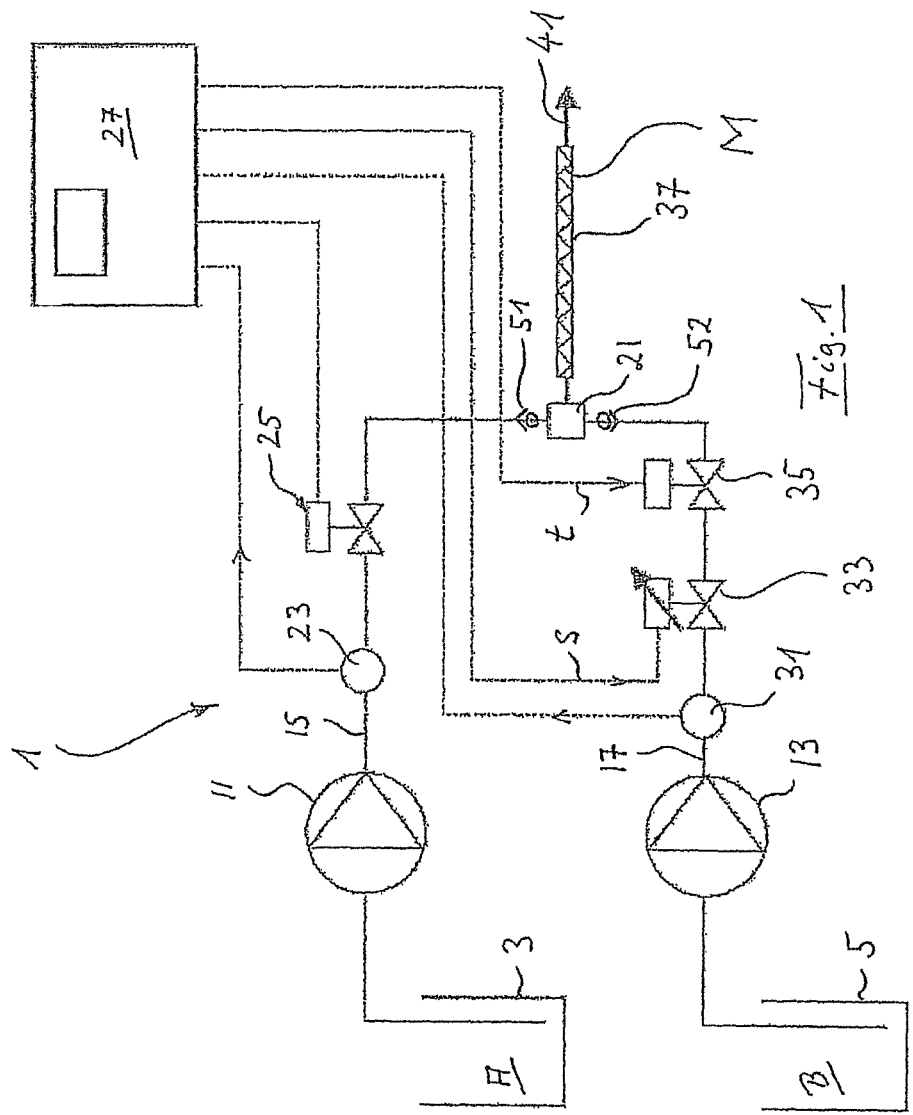
FIG. 1 shows a schematic diagram of a mixing device according to one embodiment.
Figure 2:
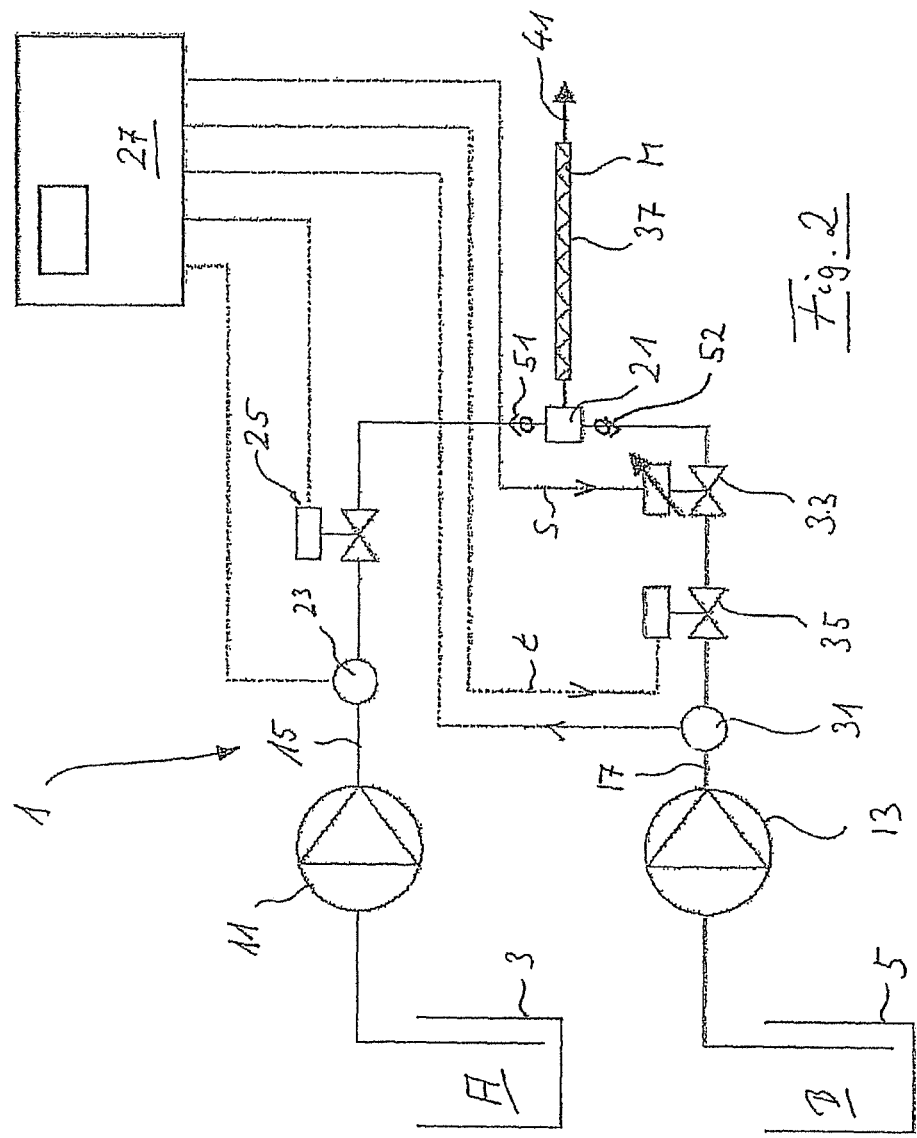
FIG. 2 shows a schematic diagram of a mixing device according to an alternative embodiment.
Figure 3:
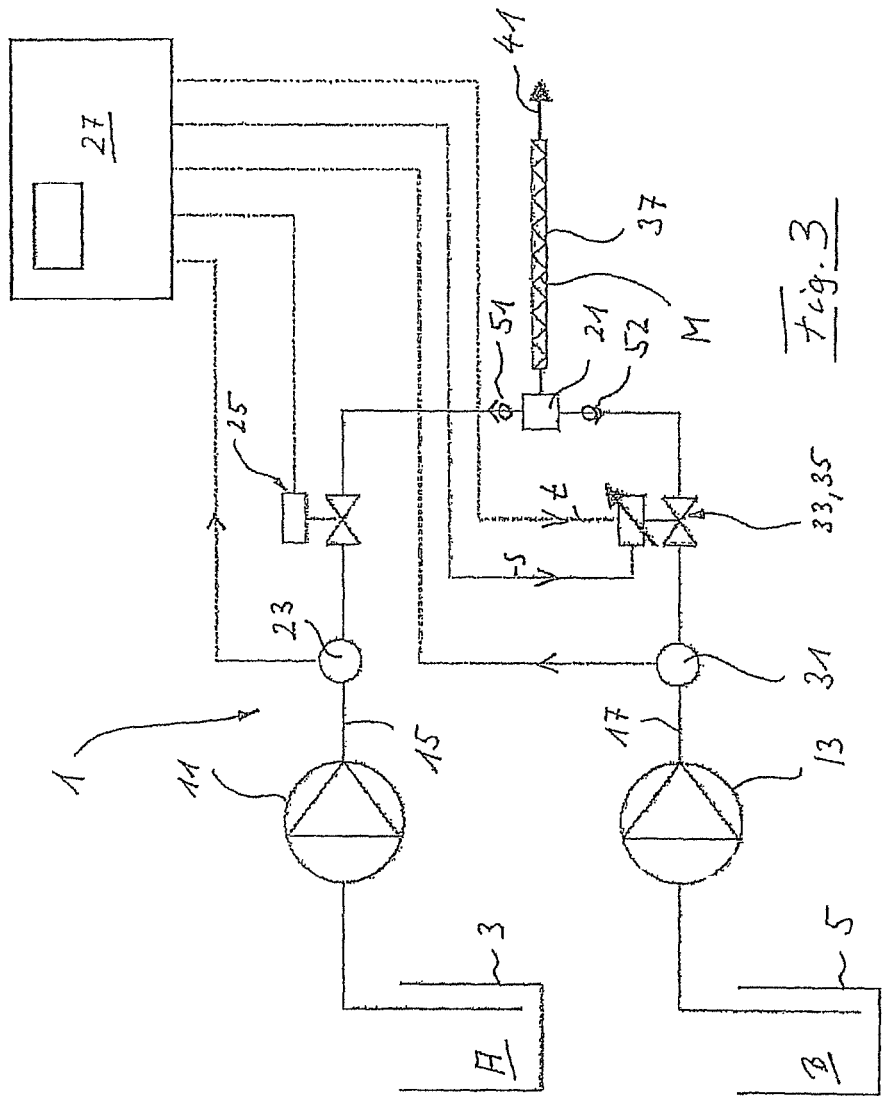
FIG. 3 shows a schematic diagram of a mixing device according to an alternative embodiment.

FIGS. 1 to 3 show in general, with reference number 1, three different embodiments of an example mixing device similar to one another in structure. To improve the readability of the description of the figures, the same reference numbers relating to the same or similar components are used for the three different embodiments.

In the represented embodiments, mixing device 1 is used for a two-component mixing system, wherein a parent component A and a feed component B are processed. In one embodiment, parent component A is a parent lacquer, and feed component B is a hardener.

An individual holding reservoir 3, 5 is stored both for parent component A and for feed component B. A piston pump 11 for parent component A and a piston pump 13 for feed component B draw respective components A, B out of reservoir 3, 5 and generate a hydraulic pressure in components A, B, wherein a pressure difference between the hydraulic pressures of 20 bar is intended to be generated. The parent component can, for example, have a hydraulic pressure of 160 bar, while the feed component has a hydraulic pressure of 180 bar. The pressure generation, which is produced by a piston pump 11, 13 in the embodiments shown in FIGS. 1-3, is designed, in certain embodiments, to provide constant hydraulic pressure conditions both for component A and also for component B during the entire operation of mixing device 1. Control-based influencing of the hydraulic pressure during the mixing method of mixing device 1 is not necessary, and in certain embodiments even ruled out. Provision can certainly be made to make the hydraulic pressure adjustable, for example, depending on a type of component A, B, with respect to physical operating conditions, such as temperature, pressure, etc., but the hydraulic pressure remains a constant as a control variable for the feed component quantity control, which is explained below.

A feed line 15, 17, in which components A, B put under hydraulic pressure set at constant are located, runs in each case from respective piston pumps 11, 13 for parent component A and for feed component B. Both feed lines 15, 17 emerge into a line junction 21, in which feed component B is added discontinuously to parent component A.

A measuring cell 23 for detecting the flow quantity for parent component A and a valve 25 are disposed in feed line 15 for parent component A, with valve 25 being set pneumatically. Measuring cell 23 for parent component A is connected to a control and regulating device 27 for the signal communication. Control and regulating device 27 receives flow quantity signals from measuring cell 23, processes the signals as appropriate according to the mixing method and emits control signals to valve 25 as appropriate in order to interrupt, as required, a control-based continuous flow of parent component A in feed line 15 to line junction 21. The continuity of the flow of parent component A is to be understood in such a way that, for the mixing method according to certain embodiments described herein, valve 25 is not actuated in order to set the mixing quantity ratio between component A and component B. Valve 25 does not represent throttling of the continuous flow, i.e., when the main mixing flow leaving mixing device 1 is released at a coating gun, parent component A flows unhindered under the influence of its hydraulic pressure of 160 bar towards line junction 21.

Located upstream of line junction 21 in each respective feed line 15, 17 is a non-return valve 51, 52, which is intended to prevent the respective other component from getting into feed line 15, 17.

Disposed in feed line 17 for feed component B is a flow quantity meter 31, which transmits an actual flow quantity signal to control and regulating device 27. A throttle valve 33 and a timing valve 35 are also disposed in feed line 17, both valves 33, 35 receiving control signals s, t from control and regulating device 27. Throttle valve 33 has an actuator, by means of which the passage cross-section (S, see FIGS. 4*d* to 6*d*) of feed line 17 can be increased or reduced in size in a control-based manner. Timing valve 35 is actuated pneumatically and, according to the embodiments shown in FIGS. 1 and 2, serves (solely) to completely open or completely close feed line 17, in order to produce the discontinuous feed of feed component B to line junction 21.

Disposed downstream of line junction 21 is a mixer, such as a static mixer 37, which performs final thorough mixing of components A, B, before main mixing flow M leaves static mixer 37 and is delivered atomized to a delivery nozzle, such as a spray gun (not represented) for the purpose of coating, which is intended to be represented by arrow 41.

When the delivery nozzle, such as the spray gun, is actuated, parent component A flows, as explained above, continuously past the line junction 21 into static mixer 37. The feed component B is fed discontinuously to parent component A on account of the closing and opening procedure of timing valve 35. When timing valve 35 opens, feed component B is injected into the continuous flow of parent component A on account of the hydraulic pressure difference between components A and B, as a result of which parent component B overtakes or displaces a partial region of the parent component flow, as a result of which a first mixing process takes place during the feed of feed component B.

When timing valve 35 is closed, there arises in main mixing flow M, before it passes into static mixer 37, a flow section which includes solely parent component A. This inhomogeneity of the main mixing flow is partially compensated for by means of static mixer 37 and in the course of the line following the latter.

Flow quantity meter 31 for feed component B constantly detects the actual feed quantity that leaves reservoir 5 of feed component B. On account of the constant flow of parent component A or on account of the measurement result of measuring cell 23 for parent component A being taken into account, a mixing quantity ratio between components A and B can be determined.

At the start of the example mixing method, the passage cross-section defined by the throttle valve 35 actuated by the pneumatic actuator is set in such a way that a target feed quantity value for feed component B stored in control and regulating device 27 is reached in a short time. When this target feed quantity value is exceeded, control and regulating device 27 causes the closing of timing valve 35 in a control-based manner, wherein the actual mixing quantity ratio between components A and B does not fall abruptly, but does so only gradually on account of inertia effects, until the components present in the lines are consumed. If the actual feed quantity correspondingly falls below the target feed quantity value, control and regulating device 27 opens timing valve 35 again, in order to inject feed component B into parent component A with at all times constant pressure conditions.

In order to increase the duration of the opening of timing valve 35 in accordance with the example mixing method, the passage cross-section of throttle valve 33 is reduced upon reception of a corresponding control signal s while the timing valve is closed, as a result of which the volume flow or the mass flow of feed component B is reduced with a constant hydraulic pressure. Consequently, the target feed quantity is reached only after a longer opening phase than was the case with the preceding timing cycle of timing valve 35. Once the target flow quantity value has been reached after a longer opening phase of timing valve 35, timing valve 35 is again closed, wherein the closing phase to the next opening is also shortened on account of the smaller volume flow, consequently on account of the reduction in the size of the passage cross-section. The effect of this is that the feed interval of timing valve 35 is markedly lengthened with a discontinuous feed of component B, whereas the feed pause of the timing valve is reduced. Flow sections with a pure parent component concentration are thus markedly reduced in size.

The embodiments according to FIGS. 1, 2 and 3 differ only in the positioning and/or implementation of throttle valve 33 and timing valve 35. In the case of the embodiment of the mixing device according to FIG. 2, timing valve 35 is disposed upstream of throttle valve 33, whereas in the mixing device according to FIG. 3 the throttle valve function as well as the timing function are constituted in a common valve component, which both leaves the passage cross-section variable and also implements a pure opening and closing movement.

The example mixing method and specific method states can be explained with the aid of the diagrams in respective FIGS. 4a to 4d and FIGS. 5a to 5d.

Four diagrams are represented in each case in FIGS. 4a to 4d and FIGS. 5a to 5d, wherein the flow quantity, the timing cycle, the ratio of the actual flow quantity to the target flow quantity and the passage cross-section setting of throttle valve 33 are illustrated over time.

Figure 4A:
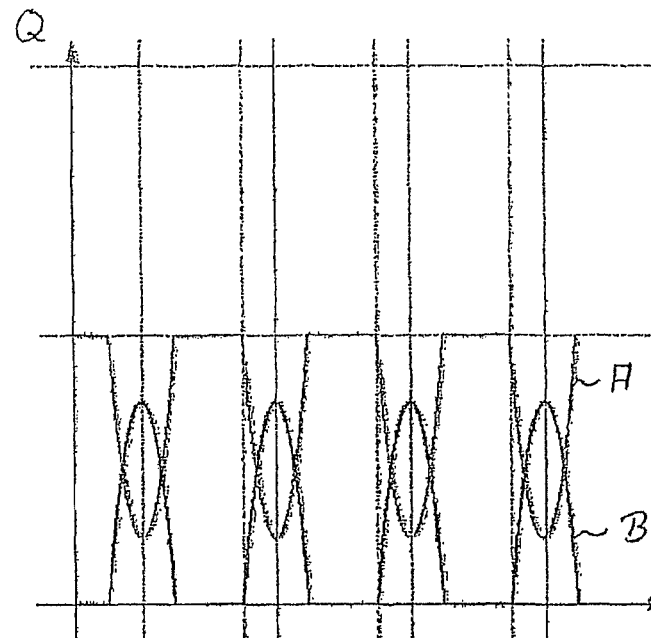
FIG. 4a shows a time/flow quantity diagram relating to an initial operational state of an example mixing device used with an example method.

FIG. 4a represents the flow quantity situation of parent component A and of feed component B at the start of the example mixing method during four cycles. Timing valve 35 is opened at time $t_1$, the closing being carried out at time $t_2$. The closed feed pause lasts until the next opening at $t_1$. A timing cycle of the timing valve is defined by $t_1$-$t_1$. A duration of $t_1$-$t_2$ represents the feed interval, while the feed pause is defined by interval $t_2$-$t_1$.

As can be seen in FIG. 4a, no flow for feed component B prevails before the actuation of timing valve $t_1$, but a maximum flow quantity for parent component A. After the opening of the timing valve, the flow for feed component B abruptly increases and, more precisely, at the expense of the flow for parent component A.

Figure 4B:
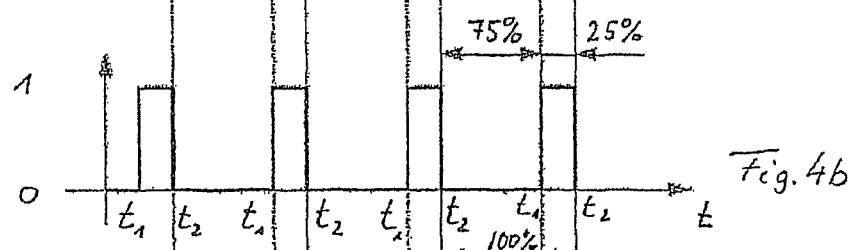
FIG. 4b shows a time/timing cycle diagram in the initial operational state.
Figure 4C:
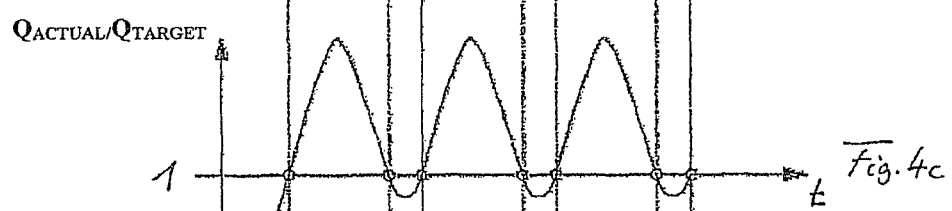
FIG. 4c shows a diagram relating to the time-related course of the ratio of the actual feed quantity to the target feed quantity in the initial operational state.

Considering FIG. 4c, the ratio of the actual feed quantity to the target feed quantity increases gradually with the opening of timing valve 35.

Figure 4D:
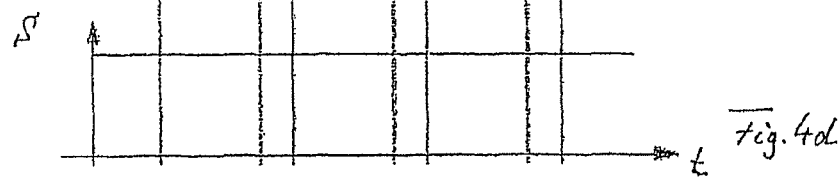
FIG. 4d shows a diagram of the time-related course of the passage cross-section at the throttle device of the example mixing device.

If flow quantity meter 31 for the control senses that the actual flow quantity exceeds the target flow quantity, timing valve 35 is switched and closed ($t_2$) in a control-based manner, as is shown by FIG. 4b. At this time, the flow for feed component B diminishes sharply in favor of the increase in the flow for parent component A. This timing cycle is repeated unchanged four times without changing the passage cross-section of throttle valve 33, which is indicated in FIG. 4d.

It can be seen with this timing rhythm that timing valve 35 is closed during a 75% proportion of the timing cycle and is opened only during a 25% proportion of the timing cycle, which is indicated in FIG. 4b.

Figure 5A:
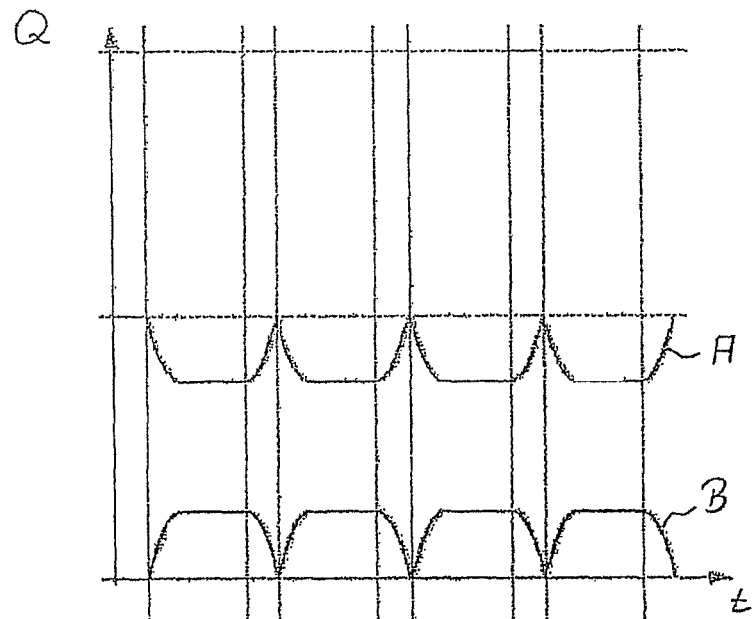
FIG. 5a shows a flow quantity/time diagram in an operational state of the example mixing device.
Figure 5B:
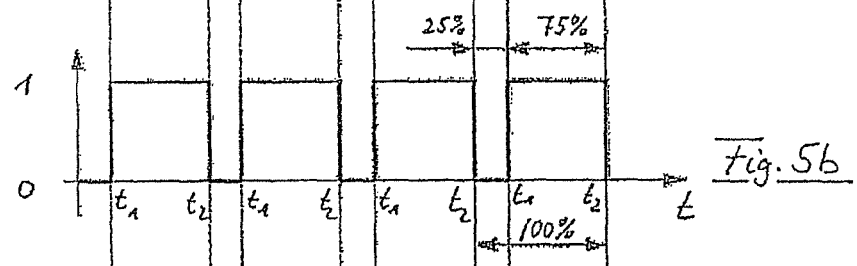
FIG. 5b shows a timing cycle/time diagram in the operational state of the example mixing device.
Figure 5C:
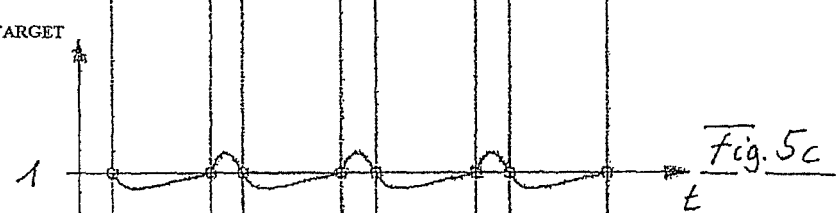
FIG. 5c shows a diagram relating to the time-related course of the ratio of the actual feed quantity to the target feed quantity in the initial operational state in a controlled operational state of the example mixing device.
Figure 5D:
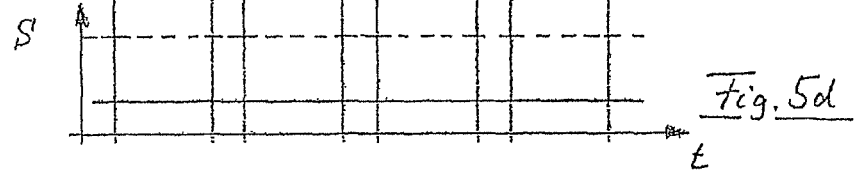
FIG. 5d shows a diagram of the time-related course of the passage cross-section at the throttle device of the example mixing device in a controlled operational state of the example mixing device.

The embodiments of the example mixing method disclosed herein extend the feed interval ($t_1$-$t_2$) at the expense of the feed pause ($t_2$-$t_1$). According to certain embodiments, this is achieved by the fact that the passage cross-section of throttle valve 33 is reduced by means of the actuator (FIG. 5d). The maximum through-flow of feed component B is thus reduced, as can be seen in FIG. 5a.

If the actual flow quantity value falls below the target flow quantity value, control and regulating device 27 switches timing valve 35 into the open state ($t_1$), which can be seen in FIG. 5b. The reduction in the flow quantity for parent component A becomes markedly smaller, because the maximum flow quantity for feed component B is reduced. At the same time, the target flow quantity is reached at a later time, which can be seen from the increased duration of the feed interval ($t_1$-$t_2$). After the target flow quantity value has been exceeded, control and regulating device 27 switches timing valve 35 into the closed state, as a result of which the feed pause ($t_2$-$t_1$) is initiated. On account of the smaller flow quantity for feed component B, the overshoot of the ratio between the actual and the target flow quantity value (FIGS. 4c and 5c) is markedly diminished, for which reason the feed pause ($t_2$-$t_1$) is reduced. When there is a drop below the target flow quantity value, the timing valve is opened again. The reduction in the cross-section is accompanied by an influence on the timing cycle such that the feed interval is extended to 75% of the entire timing cycle and the feed pause is reduced to 25% of the timing cycle.

A special case of a specific operational situation is represented in FIGS. 6a to 6d, such that the main mixing flow is intended to serve a second delivery nozzle, as a result of which the requirement for the parent component and the feed component increases markedly. As shown in FIG. 6b, timing valve 35 is switched into the open position, during which feed component B is added to parent component A. Immediately after $t_1$, the feed quantity for feed component B increases correspondingly at the expense of the feed quantity of parent component A. At time $t_x$, a second consumer, such as a second spray gun, is actuated, as result of which the parent component quantity and the feed component quantity increase abruptly, as can be seen in FIG. 6a. However, FIG. 6c clearly shows that the ratio of the actual flow quantity value to the target flow quantity value drops markedly after time $t_x$, because feed quantity B, which is permitted by throttle valve 33, is no longer sufficient to cover the total requirement of feed component B. To this extent, timing valve 35 always remains open, but the mixing quantity ratio is not reached. In this regard, the extended mixing method according to certain embodiments makes provision, after a control time $tk_1$ of, for example, 1.5 seconds (sec.), to permit a change in the passage cross-section, i.e., an increase, for throttle valve 33 itself in the opened state of the timing valve. The stepwise increase is reached after control time $t_k$ in FIG. 6d. When the trend in the ratio of the actual to the target feed quantity value is examined according to FIG. 6c, it can be ascertained by control and regulating device 27 that the flow for feed component B is still not sufficient, for which reason a further increase in the size of the passage cross-section of throttle valve 33 is carried out after $tk_2$. Only when the target flow quantity value is exceeded is timing valve 35 actuated again and closed in order correspondingly to initiate the example mixing method.

It is thus ensured that, in the case of an excessively small feed of feed component B, an excessively small mixing ratio is compensated for.

The system and the method as described herein can be designed in such a way that, once a mixing ratio has adjusted itself and scarcely any further disturbance variables occur, it is possible to dispense with the use of a timing valve. The control then takes place exclusively with the aid of throttle valve 33. It is also conceivable for the control to be extended with the aid of an additional hydraulic pressure control in certain embodiments. Both the hydraulic pressure of the feed component and also of the parent component can thereby be adjusted in a control-based manner. Moreover, in certain embodiments, an additional timing valve is provided in the parent line in order to feed the parent component in a metered manner.

The features disclosed in the above description, the figures and the claims may be of importance both individually and also in any combination for the implementation of the various embodiments. The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended the scope be defined by the claims appended hereto. Additionally, the features of various implementing embodiments may be combined to form further embodiments.

The invention claimed is:

1. A method for mixing at least two liquid components in a multi-component wet coating system, said method comprising:
   discontinuously feeding a feed component under a first hydraulic pressure set at constant through a variable passage cross-section to a parent component under a second hydraulic pressure set at constant;
   detecting an actual feed quantity of the feed component; and
   regulating the actual feed quantity of the feed component with respect to a target feed quantity for the feed component in such a way that a timing cycle of the discontinuous feeding and the variable passage cross-section for the feed component are influenced.

2. The method according to claim 1, wherein the timing cycle comprises a temporal sequence of a feed interval and a feed pause following the feed interval and is influenced in a control-based manner such that:
   i) in the case of an overshoot of the target feed quantity, a duration of the feed interval is increased and the feed pause is decreased for a following timing cycle, and the passage cross-section is reduced; and
   ii) in the case of the actual feed quantity remaining within a predetermined target feed quantity tolerance range after a lapse of a control time or of an ascertainment of the actual feed quantity that is smaller than the target feed quantity and falling in a course of time, the variable passage cross-section is increased so that the control-based influencing can be initiated according to step i).

3. The method according to claim 1, wherein the timing cycle begins with a triggering of the feed interval which ends with a triggering of the feed pause when the actual feed quantity reaches or exceeds the target feed quantity.

4. The method according to claim 1, wherein at a start thereof, an oversize is or becomes set for the passage cross-section, so that a ratio of the actual feed quantity to the target feed quantity increasing in the course of time is reached, wherein the feed quantity reaches or exceeds the target feed quantity in less than 5 seconds.

5. The method according to claim 1, wherein an actual feed quantity/target feed quantity ratio is monitored and in the case of the actual feed quantity less than the target feed quantity and/or a reduction of the actual feed quantity/target feed quantity ratio, the passage cross-section is increased in size in such a way that the actual feed quantity/target feed quantity ratio increases during a following feed interval.

6. The method according to claim 1, wherein the variable passage cross-section is changed during the feed pause.

7. The method according to claim 1, wherein the control-based influencing of the variable passage cross-section and of the timing cycle is carried out only if a time-related proportion of the feed interval of a timing cycle is less than 90%.

8. A device for mixing at least two liquid components in a multi-component wet coating system, the device comprising:
   a line system for the separate feeding of the at least two liquid components under hydraulic pressure, wherein the line system comprises a parent line for a parent component or a parent component mixture and a feed line emerging into the parent line for a feed component;
   an on/off timing valve for closing or opening the feed line and for the discontinuous feed of the feed component;
   a throttle device for changing a passage cross-section of the feed line;
   a flow quantity meter for detecting an actual flow quantity of the feed component; and
   a control of the actual flow quantity of the feed component comprising an actuator which actuates the throttle device and the control controls both the actuator and the on/off timing valve in such a way that the passage cross-section of the feed line and a timing cycle of the discontinuous feed are influenced for the control-based change of the actual flow quantity.

9. The device according to claim 8, wherein the throttle device is disposed, in a feed direction, upstream or downstream of the on/off timing valve.

10. The device according to claim 8, wherein the on/off timing valve is controlled pneumatically.

11. The method according to claim 1, wherein the variable passage cross-section is changed during the feed interval after further control times when a balanced actual feed quantity/target feed quantity ratio is ascertained.

12. The method according to claim 1, wherein the control-based influencing of the variable passage cross-section and of the timing cycle is carried out only if a time-related proportion of the feed interval of a timing cycle is less than 80%.

13. The device according to claim 8, wherein the throttle device and the on/off timing valve are combined in a common component.

* * * * *